United States Patent
Sobran et al.

(10) Patent No.: US 10,884,893 B2
(45) Date of Patent: Jan. 5, 2021

(54) DETECTING SOFTWARE BUILD ERRORS USING MACHINE LEARNING

(71) Applicant: International Business Machines Corporation, Armonk, NY (US)

(72) Inventors: Alexander Sobran, Chapel Hill, NC (US); Bo Zhang, Cary, NC (US); Bradley C. Herrin, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 16/112,506

(22) Filed: Aug. 24, 2018

(65) Prior Publication Data
US 2020/0065220 A1  Feb. 27, 2020

(51) Int. Cl.
*G06F 11/36* (2006.01)
*G06N 20/00* (2019.01)

(52) U.S. Cl.
CPC ...... *G06F 11/3608* (2013.01); *G06F 11/3664* (2013.01); *G06F 11/3692* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,367,383 B2 | 6/2016 | Henley et al. | |
| 9,378,014 B2 | 6/2016 | Wilson et al. | |
| 9,542,176 B2 | 1/2017 | Bird et al. | |
| 9,760,365 B2 | 9/2017 | Johansson et al. | |
| 2016/0034270 A1 | 2/2016 | Swierc et al. | |
| 2016/0042275 A1* | 2/2016 | Dettman | G06N 5/003 706/46 |
| 2016/0196334 A1* | 7/2016 | Bastide | G06F 16/3344 707/776 |
| 2016/0342903 A1* | 11/2016 | Shumpert | G06F 11/0721 |
| 2016/0357855 A1* | 12/2016 | Fan | G06F 16/313 |

(Continued)

OTHER PUBLICATIONS

U.S. Appl. No. 15/975,512 entitled "Identifying Potential Errors in Code Using Machine Learning," filed May 9, 2018, pp. 1-27.

(Continued)

*Primary Examiner* — Wynuel S Aquino
(74) *Attorney, Agent, or Firm* — Robert A. Voigt, Jr.; Winstead PC (57) ABSTRACT

A method, system and computer program product for detecting software build errors. A classification system is created that identifies users' questions in crowdsource data pertaining to errors in computer programs that are associated with a log report. A model is built to classify log data as bug-related or not bug-related based on the classification system. Log reports from log data obtained from crowdsource data are identified as being bug-related based on the model. After vectorizing such log reports and storing the vectorized log reports, the language of a new build log report for a software product is vectorized upon completion of the build of the software product. If the vectorized log report is within a threshold amount of distance to a stored vectorized log report, then a copy of the log report (bug-related) and a source of the log report associated with the stored vectorized log report is provided.

18 Claims, 6 Drawing Sheets

(56) References Cited

U.S. PATENT DOCUMENTS

| | | |
|---|---|---|
| 2017/0039126 A1 | 2/2017 | Wood et al. |
| 2018/0253736 A1* | 9/2018 | Rajaram .............. G06Q 30/016 |
| 2018/0285468 A1* | 10/2018 | Kohlmeier ............ G06F 16/951 |
| 2018/0349166 A1* | 12/2018 | Movsisyan ............ G06F 9/5088 |
| 2019/0122130 A1* | 4/2019 | Basavarajappa ..... G06K 9/6218 |
| 2019/0347149 A1* | 11/2019 | Panigrahi .............. G06F 11/079 |

OTHER PUBLICATIONS

Santolucito et al., "Statically Verifying Continuous Integration Configurations," arXiv, vol. 1, No. 1, Article 1, Jan. 2018, pp. 1-23.
Taneli Taipale, "Improving Software Quality with Software Error Prediction," Master's Thesis, Department of Computer Science and Engineering, University of Oulu, Dec. 2015, pp. 1-71.

* cited by examiner

DETECTING SOFTWARE BUILD ERRORS USING MACHINE LEARNING

TECHNICAL FIELD

The present invention relates generally to software development, and more particularly to detecting software build errors using machine learning.

BACKGROUND

Software development is the process of conceiving, specifying, designing, programming, documenting, testing, and bug fixing involved in creating and maintaining applications, frameworks, or other software components. Software development is also a process of writing and maintaining the source code. The writing of the source code may be referred to as "building" the software. The process of building a computer program is usually managed by a build tool, a program that coordinates and controls other programs. Examples of such programs are Meister by OpenMake® Software, Apache Ant™, Rake, etc.

In building the computer program, a process referred to as "continuous integration," may be utilized in which all the software developers' changes to the computer program are tested and reported when they are added to the mainline code base, which may be several times a day. Furthermore, in connection with building the computer program, software tools may be used to debug (process of finding and resolving defects or problems within a computer program that prevent correct operation of the computer software or system) the built computer program during the continuous integration phase prior to being released. Debugging of the built computer program requires extensive knowledge and experience with such software tools by the software developers. In particular, extensive knowledge and experience is necessary to understand the tools as well as the error messages provided by the tools. The failure points become more complex as the build grows in complexity thereby typically requiring a small dedicated team or a software engineer with extensive years of experience in these environments and tools to debug and fix the broken builds. Furthermore, new debugging software tools are constantly being developed thereby resulting in new "standard" debugging tools continuously being created. The pressure for these teams to perform and stay current on these latest standard debugging tools is too daunting, even for a dedicated team of several software engineers.

As a result, there is not currently a means for easily identifying potential errors in the computer program (code) after it is built but prior to release due to the various number of software debugging tools and the extensive knowledge and experience required of the software developers of these software tools and the error messages provided by the tools.

SUMMARY

In one embodiment of the present invention, a method for detecting software build errors comprises creating a classification system that identifies users' questions pertaining to errors in computer programs that are associated with a log report. The method further comprises building a model to classify log data as bug-related or not bug-related based on the classification system. The method additionally comprises retrieving log data from a plurality of sources involving previously-built software products, where the log data comprises questions, and where the plurality of sources comprises online forums. Furthermore, the method comprises identifying log reports from the retrieved log data that are bug-related based on the model. Additionally, the method comprises vectorizing language of the identified log reports that are bug-related using the model. In addition, the method comprises storing the vectorized log reports that are bug-related. The method further comprises vectorizing language of a build log report for a software product upon completion of a build of the software product using the model. The method additionally comprises comparing the vectorized log report with the stored vectorized log reports. Furthermore, the method comprises providing a copy of a log report and a source of the log report associated with a stored vectorized log report in response to identifying the stored vectorized log report within a threshold amount of distance to the vectorized log report.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for detecting software build errors. In one embodiment of the present invention, a classification system is created that identifies users' questions in crowdsource data (e.g., build logs, product documentations, and public online forums) pertaining to errors in computer programs that are associated with a log report, such as by using natural language processing. "Crowdsource data," as used herein, refers to data (e.g., questions involving attached log reports, questions involving bugs and errors) generated from a large group of people or organizations. Furthermore, a "log report," as used herein, refers to a computer-generated record, such as a computer-generated record in connection with the operation of a program. Such log reports may include error messages (e.g., record of critical errors that are encountered by the application, operating system or system while in operation, such as table corruption, configuration corruption, etc.). A model is then built to classify log data as bug-related or not bug-related based on the classification system. "Log data," as used herein, refers to any data pertaining to log reports, including questions regarding log reports or the log reports themselves. Log data is retrieved from a plurality of sources, such as online forums, involving previously-built software products, where the log data includes questions. Log reports from the retrieved log data that are bug-related are identified based on the model. The language of these identified log reports that are bug-related are then vectorized using the model. These log reports that are vectorized are then stored. "Vectorization," as used herein, refers to transforming the language of the log reports into vector format (e.g., column vector). After storing a set of vectorized log reports, the language of a build log report for a software product (software program) is vectorized upon completion of the build of the software product. The vectorized log report is compared with the stored vectorized log reports previously identified as being bug-related. If the vectorized log report is within a threshold amount of distance (e.g., Euclidean distance) to a stored vectorized log report, then a copy of a log report (bug-related) and a source of the log report associated with the stored vectorized log report is provided, such as to the software developer or programmer. By providing the programmer a copy of the log report that is bug-related, the programmer may halt the release of the software product. In this manner, the software developer or programmer is able to identify potential errors in the program after it is built but before it is released for public use without requiring extensive knowledge of the software debugging tools or the error messages provided by such tools.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
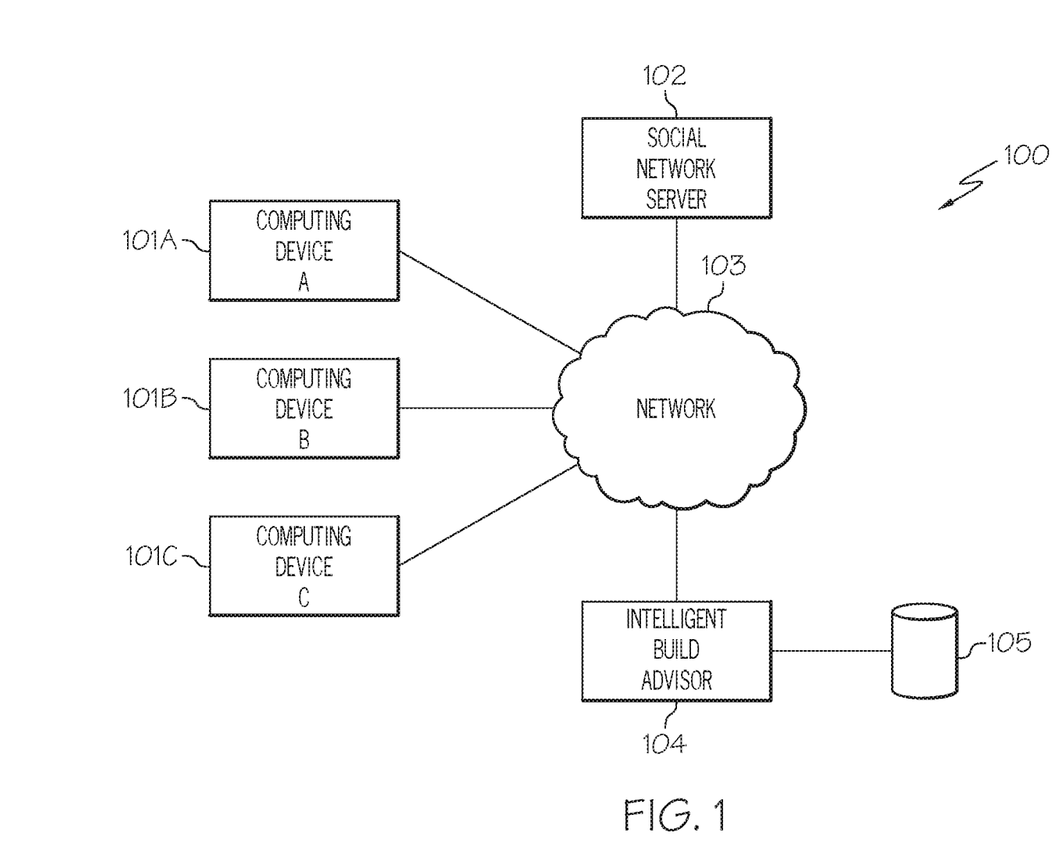
FIG. 1 illustrates a communication system for practicing the principles of the present invention in accordance with an embodiment of the present invention.

Referring now to the Figures in detail, FIG. 1 illustrates an embodiment of the present invention of a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) connected to a social network server 102 via a network 103. Computing devices 101A-101C may collectively or individually be referred to as computing devices 101 or computing device 101, respectively. It is noted that both computing devices 101 and the users of computing devices 101 may be identified with element number 101.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and social network server 102.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Social network server 102, which may be a web server configured to offer a social networking and/or microblogging service, enables users of computing devices 101 to send and read other users' posts. "Posts," as used herein, include any one or more of the following: text (e.g., comments, sub-comments and replies), audio, video images, etc. Social network server 102, as used herein, is configured to enable various collaborative activities, such as online discussion sites (e.g., public forums). Social network server 102 is connected to network 103 by wire or wirelessly. While FIG. 1 illustrates a single social network server 102, it is noted for clarity that multiple servers may be used to implement the social networking and/or microblogging service.

System 100 further includes what is referred to herein as an "intelligent build advisor" 104 connected to network 103 by wire or wirelessly. Intelligent build advisor 104 is configured to assist the software developer in identifying potential errors in a software product after it is built but prior to release without requiring the software developer to have extensive knowledge and experience of the software debugging tools or the error messages provided by these tools. Intelligent build advisor 104 identifies potential errors in the software product after it is built but prior to release utilizing vectorized log reports stored in a repository 105 connected to intelligent build advisor 104. These stored vectorized log reports are vectorized log reports that are bug-related. "Bug-related," as used herein, refers to errors, flaws, failures or faults in the computer program or system that causes it to produce an incorrect or unexpected result or to behave in unintended ways. In one embodiment, the log reports associated with these vectorized log reports are stored in repository 105. Furthermore, in one embodiment, these stored log reports contain the vector representation of the log report, a source of the associated log report and a classification (e.g., bug-related) of the associated log report.

As discussed in further detail below, the language of a build log report for a software product upon completion of the build of the software product is vectorized, which is then compared with the vectorized log reports stored in repository 105. A programmer or software developer is provided a copy of the log report associated with a stored vectorized log report that is closest in distance to the vectorized log report when the vectorized log report is similar to the stored vectorized log report within a threshold amount of distance. "Log report," as used herein, refers to computer-generated records, such as computer-generated records in connection with the operation of a program. Such log reports may include error messages (e.g., record of critical errors that are encountered by the application, operating system or system while in operation, such as table corruption, configuration corruption, etc.). The language of such log reports may be vectorized by intelligent build advisor 104. "Vectorization,"

as used herein, refers to transforming the language of the log reports into vector format (e.g., column vector). A description of the hardware configuration of intelligent build advisor 104 is provided below in connection with FIG. 2.

System 100 is not to be limited in scope to any one particular network architecture. System 100 may include any number of computing devices 101, social network servers 102, networks 103, intelligent build advisors 104 and repositories 105. Furthermore, while FIG. 1 illustrates intelligent build advisor 104 as being a separate physical device, some or all of the functionality of intelligent build advisor 104 may reside in computing device 101.

Figure 2:
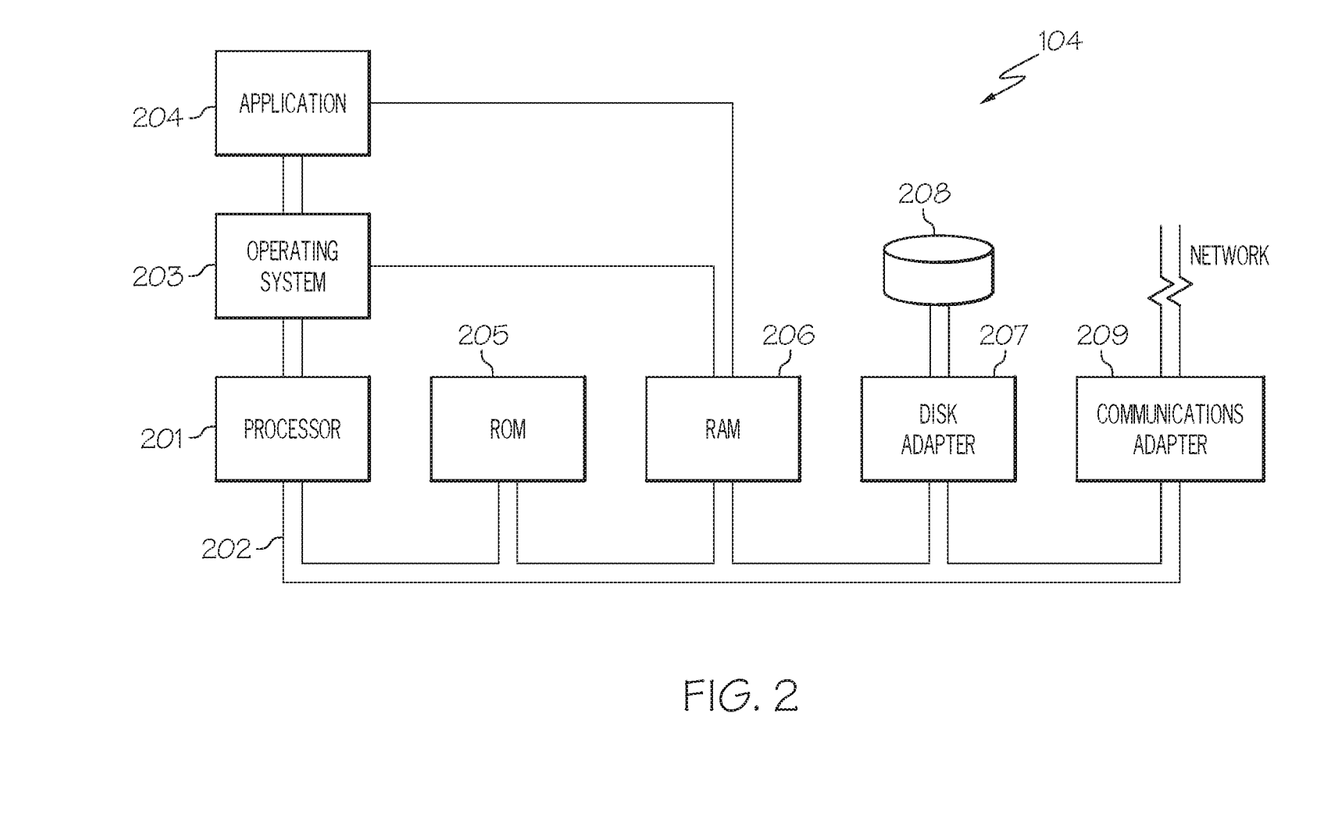
FIG. 2 illustrates an embodiment of the present invention of a hardware configuration of an intelligent build advisor which is representative of a hardware environment for practicing the present invention.

Referring now to FIG. 2, FIG. 2 illustrates a hardware configuration of intelligent build advisor 104 (FIG. 1) which is representative of a hardware environment for practicing the present invention. Referring to FIG. 2, intelligent build advisor 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for identifying potential errors in a software product after it is built but prior to release as discussed below in association with FIGS. 3-6.

Referring again to FIG. 2, read-only memory ("ROM") 205 is coupled to system bus 202 and includes a basic input/output system ("BIOS") that controls certain basic functions of intelligent build advisor 104. Random access memory ("RAM") 206 and disk adapter 207 are also coupled to system bus 202. It should be noted that software components including operating system 203 and application 204 may be loaded into RAM 206, which may be intelligent build advisor's 104 main memory for execution. Disk adapter 207 may be an integrated drive electronics ("IDE") adapter that communicates with a disk unit 208, e.g., disk drive. It is noted that the program for identifying potential errors in a software product after it is built but prior to release, as discussed below in association with FIGS. 3-6, may reside in disk unit 208 or in application 204.

Intelligent build advisor 104 may further include a communications adapter 209 coupled to bus 202. Communications adapter 209 interconnects bus 202 with an outside network (e.g., network 103 of FIG. 1) thereby allowing intelligent build advisor 104 to communicate with computing devices 101 and social network server 102.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, in building the computer program, a process referred to as "continuous integration," may be utilized in which all the software developers' changes to the computer program are tested and reported when they are added to the mainline code base, which may be several times a day. Furthermore, in connection with building the computer program, software tools may be used to debug (process of finding and resolving defects or problems within a computer program that prevent correct operation of the computer software or system) the built computer program during the continuous integration phase prior to being released. Debugging of the built computer program requires extensive knowledge and experience with such software tools by the software developers. In particular, extensive knowledge and experience is necessary to understand the tools as well as the error messages provided by the tools. The failure points become more complex as the build grows in complexity thereby typically requiring a small dedicated team or a software engineer with extensive years of experience in these environments and tools to debug and fix the broken builds. Furthermore, new debugging software tools are constantly being developed thereby resulting in new "standard" debugging tools continuously being created. The pressure for these teams to perform and stay current on these latest standard debugging tools is too daunting, even for a dedicated team of several software engineers. As a result, there is not currently a means for easily identifying potential errors in the computer program (code) after it is built but prior to release due to the various number of software debugging tools and the extensive knowledge and experience required of the software developers of these software tools and the error messages provided by the tools.

Figure 3:
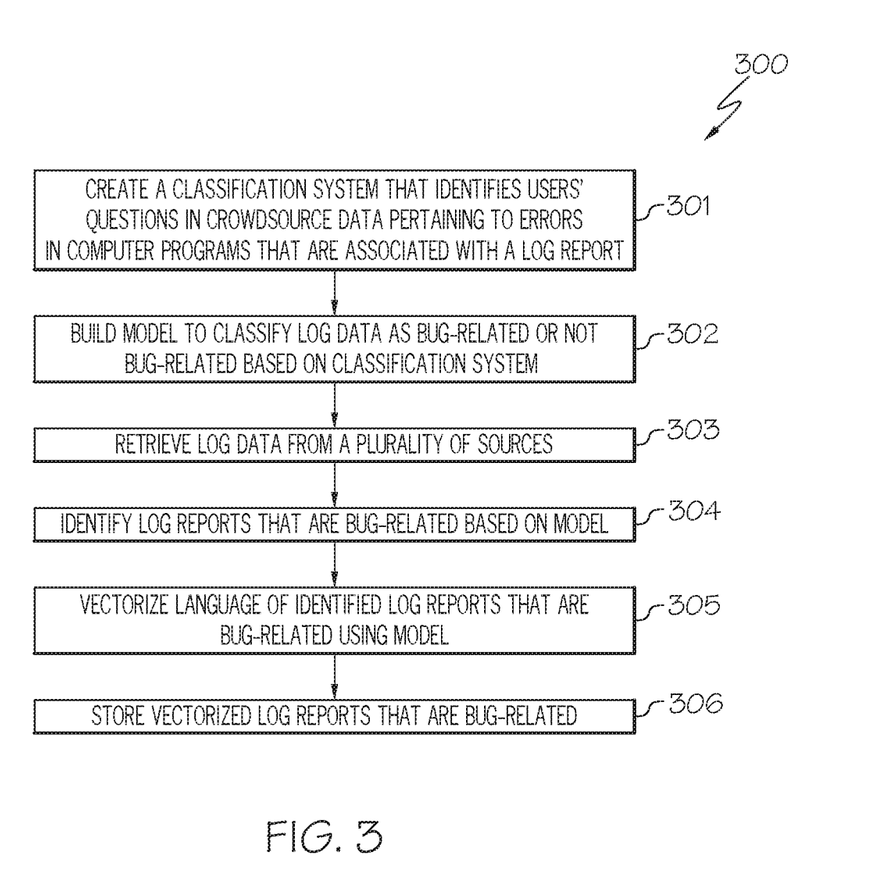
FIG. 3 is a flowchart of a method for building a model for classifying log data as bug-related or not bug-related in accordance with an embodiment of the present invention.
Figure 4:
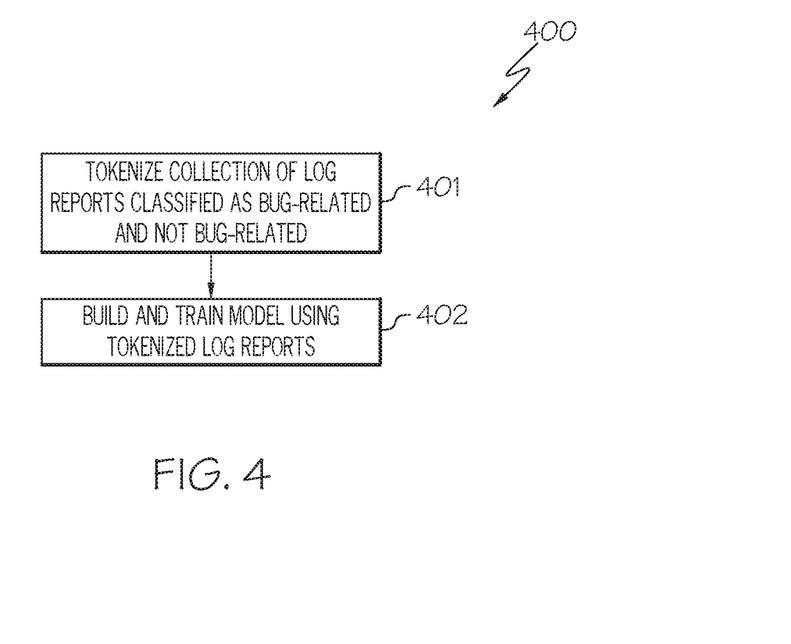
FIG. 4 is a flowchart of a method for building and training the model using tokenized log reports in accordance with an embodiment of the present invention.
Figure 5:
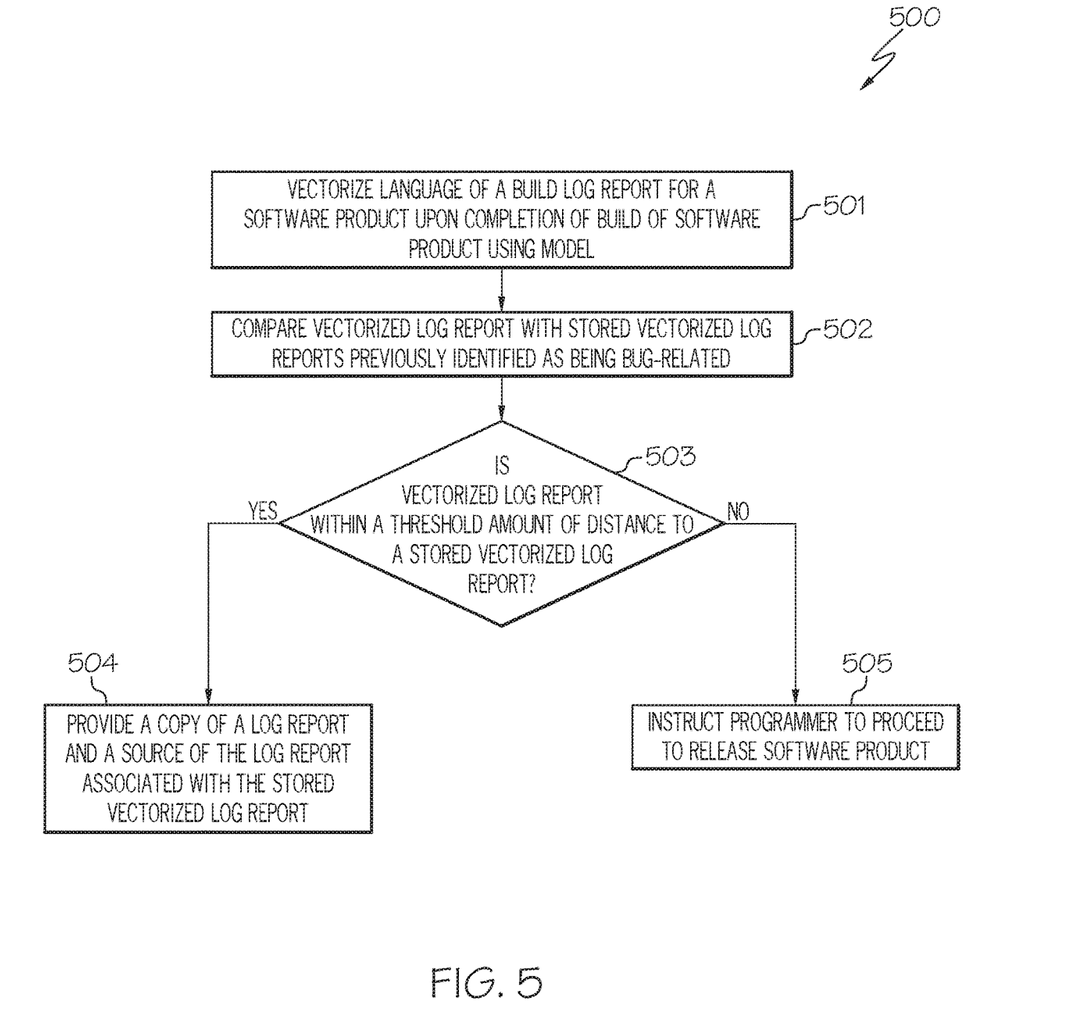
FIG. 5 is a flowchart of a method for detecting software build errors using the stored vectorized log reports in accordance with an embodiment of the present invention.
Figure 6:
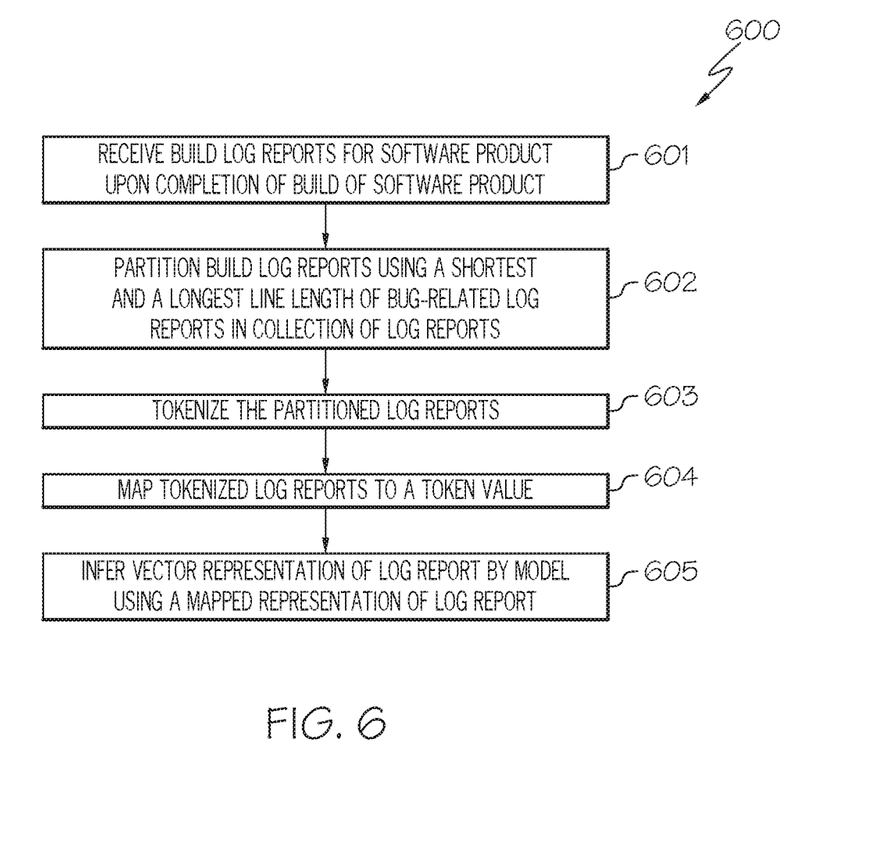
FIG. 6 is a flowchart of a method for determining the vector representation of a log report using the model in accordance with an embodiment of the present invention.

The embodiments of the present invention provide a means for identifying potential errors in the computer program (code) after it is built but prior to release due without requiring the software developers to possess extensive knowledge and experience of the software debugging tools and the error messages provided by the tools as discussed below in connection with FIGS. 3-6. FIG. 3 is a flowchart of a method for building a model for classifying log data as bug-related or not bug-related. FIG. 4 is a flowchart of a method for building and training the model using tokenized log reports. FIG. 5 is a flowchart of a method for detecting software build errors using the stored vectorized log reports. FIG. 6 is a flowchart of a method for determining the vector representation of a log report using the model.

As stated above, FIG. 3 is a flowchart of a method 300 for building a model for classifying log data as bug-related or not bug-related in accordance with an embodiment of the present invention.

Referring to FIG. 3, in conjunction with FIGS. 1-2, in step 301, intelligent build advisor 104 creates a classification system that identifies users' questions in crowdsource data (e.g., build logs, product documentations, and public online forums) pertaining to errors in computer programs that are associated with a log report, such as by using natural language processing. "Crowdsource data," as used herein, refers to data (e.g., questions involving attached log reports, questions involving bugs and errors) generated from a large group of people or organizations. Furthermore, as discussed above, a "log report" refers to a computer-generated record, such as a computer-generated record in connection with the operation of a program. Such log reports may include error messages (e.g., record of critical errors that are encountered by the application, operating system or system while in operation, such as table corruption, configuration corruption, etc.).

It is noted that not all questions in the crowdsource data, such as questions posted online in an online forum, that are bug-related (pertaining to errors in computer programs) include a log report. Neither are all questions that are posted online that include a log report are bug-related. For example, users can post questions about the features of a computer program. Alternatively, users can post bug-related questions without posting log reports. As a result, in one embodiment, the classification system is created by performing a classification of identifying users' questions, such as in online forums, with reported loggings and performing a classification of identifying bug-related questions, such as in online forums. These classifications are then combined to generate the classification system that identifies users' questions in crowdsource data pertaining to errors in computer programs that are associated with a log report.

In one embodiment, the classification of logging-reported questions is accomplished by defining a collection of tags for general questions with reported loggings, such as loggings and log reports, indicated by logging_tags={L1, L2, . . . , Ln}. A training example labelled with logging_tags with the attached logging report is treated as a positive example. These log reports from the positive cases are then tokenized. As used herein, "tokenization," refers to breaking up a sequence of strings into pieces, such as words, keywords, phrases, symbols and other elements called tokens. The relative frequency of each tokenized word is then calculated. The logging part is then identified by checking formatting changes (such as "'before and after the raw formatting) or checking the attachment. Next, the content of this potential logging is tokenized followed by finding the relative frequency of each tokenized word from the above step. The tokenized content may be stored as the textual features with the frequency of these terms as values. The classification system is then implemented to automatically identify logging-reported questions by implementing a decision tree model using all the textual features. In one embodiment, logging-reported questions are identified in crowdsource data by implementing the decision tree model using natural language processing. For example, logging-reported questions may be identified in crowdsource data by intelligent build advisor 104 identifying keywords from the decision tree model in the questions using natural language processing.

In one embodiment, the classification of bug-related questions is accomplished by defining a collection of tags for general bug tracking questions, such as bugs and errors, indicated by bug_tags={B1, B2, . . . , Bn}. A training example labelled with bug_tags is treated as a positive example and a training example that is not labelled with bug_tags is treated as a negative example. The title, body, comments, and answer in the crowdsource data is tokenized to capture terms that co-occur with the above-defined bug_tags. Stop words are then removed. The top N terms are selected as textual features with the frequency of these terms as values.

Additionally, in one embodiment, sentiment analysis is performed on the title and body of the questions of the crowdsource data. For example, in one embodiment, intelligent build advisor 104 performs the sentiment analysis on the title and body of the questions of the crowdsource data and calculates the sentiment scores. Sentiment analysis, as used herein, refers to the use of natural language processing, text analysis, computational linguistics, and biometrics to systematically identify, extract, quantify, and study affective states and subjective information. For example, natural language processing may be used to determine the attitude of the writer or subject of the crowdsource data pertaining to building a software product. Such attitudes may be determined based on the types of words (e.g., good, poor) detected by intelligent build advisor 104 when analyzing the texts of bug-related questions with a log report in the crowdsource data utilizing natural language processing.

While there are many available lexicons and corpora for sentiment analysis, they cannot be used directly for analyzing the sentiment of a technical question on a question and answer forum. Online question and answer forums contain many tech buzzwords, abbreviations, shortened words, overuse of punctuation marks, and so on. Either of these may not conform to grammatical rules but could be an indication of a strong positive or negative emotion. As a result, in one embodiment, a customized lexicon is built with weighted scores. In one embodiment, the customized lexicon is built by finding the most common positive and negative words; collecting words that co-occur with either these positive or negative words; using the frequency of each word as the weight; and performing sentimental analysis using a naive Bayes classifier based on the each word's sentiment classification and corresponding weight. This sentimental score is then used as a feature for the main classification task. The classification system is then implemented to automatically identify bug-related questions by implementing a machine learning meta-algorithm, such as an Adaptive Boosting model (AdaBoost), using all the selected features to convert weak classifiers to a strong classifier.

In one embodiment, the classifications discussed above are combined to flag questions that are bug-related (pertaining to errors in computer programs) that include a log report.

In step 302, intelligent build advisor 104 builds a model to classify log data as bug-related or not bug-related based on the classification system created in step 301. "Log data," as used herein, refers to any data pertaining to log reports, including questions regarding log reports or the log reports themselves.

In one embodiment, a collection of log reports are classified as being bug-related and not bug-related, such as by using the classification system created in step 301. Such a collection of log reports may be obtained from various sources, such as crowdsource data. As discussed in FIG. 4, intelligent build advisor 104 builds and trains the models using this collection (or "corpus") of log reports.

FIG. 4 is a flowchart of a method 400 for building and training the model using tokenized log reports in accordance with an embodiment of the present invention.

Referring to FIG. 4, in conjunction with FIGS. 1-3, in step 401, intelligent build advisor 104 tokenizes the collection of log reports ("log corpus") classified as bug-related and not bug-related. "Tokenization," as used herein, refers to breaking up a sequence of strings into pieces, such as words, keywords, phrases, symbols and other elements called tokens.

In step 402, intelligent build advisor 104 builds and trains the model using these tokenized log reports.

In one embodiment, the frequency of the tokenized items (e.g., words) is counted. Items that are below a threshold frequency in the corpus will be mapped to a single binned token value. This mapping may be stored, such as in repository 105, for real-time usage.

Those items that are at or above the threshold frequency may be used to build and train the model, such as a Doc2Vec-DBOW (distributed bag of words) or a Word2Vec-DBOW model. In one embodiment, the model is trained on the log corpus to create embeddings for the logs as well as trained on the underlying natural language processing filtered tokens in the log report. The vector representation of the log reports in the trained corpus is then stored with the model. After the continuous integration process is complete, the log reports of the continuous integration process are windowed in sequence in lines where the window size is varied based on the possible number of lines in a log report.

In one embodiment, the vector representation of each tokenized log report is inferred from the model and is stored in the original log report, which may be stored in repository 105. Furthermore, in one embodiment, these stored log reports contain the source of the log report and a classification (e.g., bug-related) of the log report.

Returning to FIG. 3, in conjunction with FIGS. 1-2 and 4, in step 303, intelligent build advisor 104 retrieves the log data from a plurality of sources, such as crowdsource data (e.g., build logs, product documentations, and public online forums), involving previously-built software products, where the log data includes questions, such as questions that are bug-related with reported log reports.

In step 304, intelligent build advisor 104 identifies log reports from the retrieved log data that are bug-related based on the model. In one embodiment, intelligent build advisor 104 identifies log reports of previously-built software products containing errors pertaining to building these software products by implementing the classification system (discussed in step 301) on crowdsource data (e.g., build logs, product documentations, and public forums). The crowdsource data may contain public or proprietary data. Such proprietary data may be provided directly from the company who is the source of the proprietary data. Pertinent public data may be obtained online, such as via public forums, by intelligent build advisor 104 utilizing natural language processing. For example, public data related to log reports may be identified by intelligent build advisor 104 identifying keywords, such as "log report." In one embodiment, intelligent build advisor 104 identifies log reports of previously-built software products containing errors pertaining to building these software products based on identifying questions pertaining to errors in building these software products that are associated with a log report by analyzing crowdsource data using natural language processing and the classification system discussed above. For example, log reports may be identified based on identifying online discussions regarding such log reports. For instance, intelligent build advisor 104 may identify such log reports based on keywords used in the online discussion, such as "actual result," "expected result" and "log report," using natural language processing and determining that such language is directed to a bug-related log report based on the classification system discussed above.

By utilizing crowdsource data, intelligent build advisor 104 will be able to provide accurate recommendations (discussed further below) as to halt or release the software product by classifying relationships between crowdsource data (e.g., forums, published documentations, real time build logs) with to the minute knowledge of changes in these landscapes whether they be public or proprietary to ultimately provide an immediate fix based on identifying a vectorized log report that is closest in distance to the vectorized log report of a recent build log report as discussed further below.

In step 305, intelligent build advisor 104 vectorizes the language of the log reports discovered in step 304 (log reports that are bug-related) using the model. "Vectorization," as used herein, refers to transforming the language of the log reports into vector format (e.g., column vector). In one embodiment, the language of the log report is vectorized using the machine learning model of the present invention (e.g., Doc2Vec-DBOW, Word2Vec-DBOW). For example, a machine learning model is used to map the log reports classified as bug-related to vectors. For instance, the machine learning algorithm of Doc2vec or Word2vec could be used to vectorize the language of the log report into vector format.

In step 306, intelligent build advisor 104 stores the vectorized log reports that are bug-related, such as in repository 105. In one embodiment, the log reports that are vectorized are stored in repository 105, where the content of such log reports contain the vector representation of the log report, a source of the log report and a classification (e.g., bug-related) of the log report.

After building the repository of vectorized log reports, intelligent build advisor 104 may utilize such vectorized log reports to identify potential errors in a software product after it is built but prior to release as discussed below in connection with FIG. 5.

FIG. 5 is a flowchart of a method 500 for detecting software build errors using the stored vectorized log reports in accordance with an embodiment of the present invention Referring to FIG. 5, in conjunction with FIGS. 1-4, in step 501, intelligent build advisor 104 vectorizes the language of a build log report for a software product (software program) upon completion of the build of the software product. As discussed above, "vectorization," as used herein, refers to transforming the language of the log reports into vector format (e.g., column vector). In one embodiment, the language of the build log report is vectorized using machine learning, such as the machine learning model of the present invention (e.g., Doc2vec-DBOW, Word2vec-DBOW).

During continuous integration, new build log reports are generated. In one embodiment, these build log reports are vectorized as discussed below in connection with FIG. 6.

FIG. 6 is a flowchart of a method 600 for determining the vector representation of a log report using the model in accordance with an embodiment of the present invention.

Referring to FIG. 6, in conjunction with FIGS. 1-5, in step 601, intelligent build advisor 104 receives the build log reports for the software product upon completion of the build of the software product.

In step 602, intelligent build advisor 104 partitions the build log reports using a shortest and a longest line length of bug-related log reports in the collection of log reports, such as the collection of log reports used for training the model. In one embodiment, each continuous subset of lines in the new log reports greater than or equal to the shortest length and less than or equal to the longest length is considered a partition.

In step 603, intelligent build advisor 104 tokenizes the partitioned log reports.

In step 604, intelligent build advisor 104 maps the tokenized log reports to a value, such as via a stored mapping (see discussion in connection with step 402). In one embodiment, if a token does not exist in the mapping it is binned into a single unknown value.

In step 605, intelligent build advisor 104 infers a vector representation of a log report using the mapped representation of the log report. As discussed further below, this vector representation is compared against all stored vector representation of the corpus, such as by using cosine similarity. In one embodiment, only the most similar corpus vector is considered.

If the most similar corpus vector is above a set threshold, then the user will be warned and presented with the corpus vector's associated corpus log report and source of that log report.

Returning to FIG. 5, in conjunction with FIGS. 1-4 and 6, in step 502, intelligent build advisor 104 compares the vectorized log report with the stored vectorized log reports previously identified as being bug-related.

In step 503, a determination is made by intelligent build advisor 104 as to whether the vectorized log report is within a threshold amount of distance (e.g., Euclidean distance) to a stored vectorized log report. In one embodiment, the threshold amount of distance is user-specified.

If the vectorized log report is within a threshold amount of distance (e.g., Euclidean distance) to a stored vectorized log report, then, in step 504, intelligent build advisor 104 provides a copy of a log report (bug-related) and a source of the log report associated with the stored vectorized log report, such as to the software developer or programmer.

In one embodiment, by providing the programmer a copy of the log report that is bug-related, the programmer may halt the release of the software product. In one embodiment, the vectorized log report closest in distance to the stored vectorized log report corresponds to the vectorized report that is within a threshold amount of distance from the stored vectorized log report. However, in situations where there are multiple stored vectorized log reports that are within a threshold amount of distance from the vectorized log report, intelligent build advisor 104 provides the programmer a copy of the log report associated with one of those multiple stored vectorized log reports that is the closest in distance to the vectorized log report.

In this manner, the software developer or programmer is able to identify potential errors in the program after it is built but before it is released for public use without requiring extensive knowledge of the software debugging tools or the error messages provided by such tools.

Furthermore, in this manner, the functionality or capability of computing systems is improved by preventing a team of software engineers from spending time and utilizing computing resources (e.g., processing resources) in attempting to identify and understand the errors (bugs) in the code. By reducing the amount of computing resources being utilized by software developers from identifying and understanding errors in the code, computing resources (e.g., processing resource) are more efficiently utilized.

Furthermore, the present invention improves the technology or technical field involving software development. As discussed above, there is not currently a means for easily identifying potential errors in the computer program (code) after it is built but prior to release due to the various number of software debugging tools and the extensive knowledge and experience required of the software developers of these software tools and the error messages provided by the tools. The present invention improves such technology by utilizing vectorized log reports, which may be stored in a repository. Such log reports may be identified from crowdsource data using a classification system. In one embodiment, these log reports are vectorized using a machine learning model. After storing these vectorized log reports to build a repository of vectorized log reports, the language of a build log report for a software product is vectorized upon completion of the build of the software product, which is then compared with the stored vectorized log reports. The release of the software product is halted and the software developer or programmer is provided a copy of the log report associated with the stored vectorized log report closest in distance to the vectorized log report when the vectorized log report is within a threshold amount of distance to the stored vectorized log report. As a result, potential errors in the program are identified after it is built but before it is released for public use without requiring extensive knowledge of the software debugging tools or the error messages provided by such tools.

Returning to step 503, if, however, the vectorized log report is not within a threshold amount of distance (e.g., Euclidean distance) to a stored vectorized log report, then, in step 505, intelligent build advisor 104 instructs the programmer to proceed to release the software product.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for detecting software build errors, the computer program product comprising a computer readable storage medium having program code embodied therewith, the program code comprising the programming instructions for:
   creating a classification system that identifies users' questions pertaining to errors in computer programs that are associated with a log report;
   building a model to classify log data as bug-related or not bug-related based on said classification system;
   retrieving log data from a plurality of sources involving previously-built software products, wherein said retrieved log data comprises questions, wherein said plurality of sources comprises online forums;
   identifying log reports from said retrieved log data that are bug-related based on said model;
   vectorizing language of said identified log reports that are bug-related using said model;
   storing said vectorized log reports that are bug-related;
   vectorizing language of a build log report for a software product upon completion of a build of said software product using said model;
   comparing said vectorized log report with said stored vectorized log reports;
   providing a copy of a log report and a source of said log report associated with a stored vectorized log report in response to identifying said stored vectorized log report within a threshold amount of distance to said vectorized log report; and
   instructing a programmer to proceed to release said software product in response to said vectorized log report not being within said threshold amount of distance to a stored vectorized log report.

2. The computer program product as recited in claim 1, wherein the program code further comprises the programming instructions for:
   performing a classification of identifying users' questions with reported loggings; and
   performing a classification of identifying bug-related questions;
   wherein said classifications are combined to generate said classification system that identifies users' questions pertaining to errors in computer programs that are associated with a log report.

3. The computer program product as recited in claim 1, wherein said log report of said vectorized log report contains a vector representation of said log report, a source of said log report and a classification of said log report.

4. The computer program product as recited in claim 1, wherein the program code further comprises the programming instructions for:
   tokenizing a collection of log reports classified as bug-related and not bug-related; and
   training said model using said tokenized log reports.

5. The computer program product as recited in claim 4, wherein the program code further comprises the programming instructions for:
   receiving a plurality of build log reports for said software product upon completion of said build of said software product; and
   partitioning said plurality of build log reports using a shortest and a longest line length of bug-related log reports in said collection of log reports.

6. The computer program product as recited in claim 5, wherein the program code further comprises the programming instructions for:
   tokenizing said partitioned log reports; and
   mapping said tokenized log reports to a token value.

7. The computer program product as recited in claim 6, wherein the program code further comprises the programming instructions for:
  inferring a vector representation of a log report by said model using a mapped representation of said log report.

8. The computer program product as recited in claim 4, wherein the program code further comprises the programming instructions for:
  counting a frequency of tokenized items;
  mapping tokenized items that are below a threshold frequency to a single binned token value; and
  training said model using tokenized items that are at or above said threshold frequency.

9. The computer program product as recited in claim 1, wherein said users' questions are identified in crowdsource data.

10. A system, comprising:
  a memory for storing a computer program for detecting software build errors; and
  a processor connected to said memory, wherein said processor is configured to execute the program instructions of the computer program comprising:
    creating a classification system that identifies users' questions pertaining to errors in computer programs that are associated with a log report;
    building a model to classify log data as bug-related or not bug-related based on said classification system;
    retrieving log data from a plurality of sources involving previously-built software products, wherein said retrieved log data comprises questions, wherein said plurality of sources comprises online forums;
    identifying log reports from said retrieved log data that are bug-related based on said model;
    vectorizing language of said identified log reports that are bug-related using said model;
    storing said vectorized log reports that are bug-related;
    vectorizing language of a build log report for a software product upon completion of a build of said software product using said model;
    comparing said vectorized log report with said stored vectorized log reports;
    providing a copy of a log report and a source of said log report associated with a stored vectorized log report in response to identifying said stored vectorized log report within a threshold amount of distance to said vectorized log report; and
    instructing a programmer to proceed to release said software product in response to said vectorized log report not being within said threshold amount of distance to a stored vectorized log report.

11. The system as recited in claim 10, wherein the program instructions of the computer program further comprise:
  performing a classification of identifying users' questions with reported loggings; and
  performing a classification of identifying bug-related questions;
  wherein said classifications are combined to generate said classification system that identifies users' questions pertaining to errors in computer programs that are associated with a log report.

12. The system as recited in claim 10, wherein said log report of said vectorized log report contains a vector representation of said log report, a source of said log report and a classification of said log report.

13. The system as recited in claim 10, wherein the program instructions of the computer program further comprise:
  tokenizing a collection of log reports classified as bug-related and not bug-related; and
  training said model using said tokenized log reports.

14. The system as recited in claim 13, wherein the program instructions of the computer program further comprise:
  receiving a plurality of build log reports for said software product upon completion of said build of said software product; and
  partitioning said plurality of build log reports using a shortest and a longest line length of bug-related log reports in said collection of log reports.

15. The system as recited in claim 14, wherein the program instructions of the computer program further comprise:
  tokenizing said partitioned log reports; and
  mapping said tokenized log reports to a token value.

16. The system as recited in claim 15, wherein the program instructions of the computer program further comprise:
  inferring a vector representation of a log report by said model using a mapped representation of said log report.

17. The system as recited in claim 13, wherein the program instructions of the computer program further comprise:
  counting a frequency of tokenized items;
  mapping tokenized items that are below a threshold frequency to a single binned token value; and
  training said model using tokenized items that are at or above said threshold frequency.

18. The system as recited in claim 10, wherein said users' questions are identified in crowdsource data.

* * * * *